United States Patent [19]

Chen

[11] Patent Number: 5,618,128
[45] Date of Patent: Apr. 8, 1997

[54] WIPER ARM CONNECTOR

[76] Inventor: Liang-Yuan Chen, P.O. Box 82-144, Taipei, Taiwan

[21] Appl. No.: 632,564

[22] Filed: Apr. 15, 1996

[51] Int. Cl.$^6$ ........................................ B60S 1/40
[52] U.S. Cl. .......................... 403/344; 403/3; 15/250.32
[58] Field of Search ........................ 403/3, 4, 344, 403/403; 15/250.32, 250.33, 250.31

[56] References Cited

U.S. PATENT DOCUMENTS

| | | | |
|---|---|---|---|
| 3,562,875 | 2/1971 | Lindsey et al. | 403/344 X |
| 3,672,613 | 6/1972 | Oriani | 403/344 X |
| 3,824,648 | 7/1974 | Van Den Berg et al. | 15/250.32 |

FOREIGN PATENT DOCUMENTS 228998  7/1960  Australia ................. 15/250.32

*Primary Examiner*—Anthony Knight
*Attorney, Agent, or Firm*—Alfred Lei

[57] ABSTRACT

A wiper arm connector including a first jaw having a cavity at the inner side formed with a plurality of teeth a second jaw having a cavity at the inner side formed with a plurality of teeth, a first packing having an opening at a central portion and a toothed portion at an upper portion, a second packing having an opening at a central portion and a toothed portion at an upper portion, and a locking pin inserted through the first and second jaws to engage with a nut, such that the connector can be conveniently connected with wiper arm of different sizes and shapes.

1 Claim, 4 Drawing Sheets

WIPER ARM CONNECTOR

BACKGROUND OF THE INVENTION

1. Field of the Invention

This invention relates to a wiper arm connector which can be connected with wiper arms of different sizes.

2. Description of the Prior Art

It has been found that the conventional wiper arms on the marketplace are of different sizes so that it is necessary to use a particular connector to connect a wiper arm with a windshield wiper. Hence, once a wiper arm connector is not working or does not work properly, the user must go to find a particular wiper arm connector for a certain kind of wiper arm thus causing much inconvenience. Furthermore, it is common for a user to spend a lot of time trying to find the particular connector. Quite often, the user simply replaces the entire wiper arm with a new one because the appropriate connector cannot be located, thereby wasting both time and money.

Therefore, it is an object of the present invention to provide an improved wiper arm connector which can obviate and mitigate the above-mentioned drawbacks.

SUMMARY OF THE INVENTION

This invention relates to an improved wiper arm connector.

It is the primary object of the present invention to provide a wiper arm connector which can be connected with wiper arms of different sizes.

It is another object of the present invention to provide a wiper arm connector which is simple in structure.

It is still another object of the present invention to provide a wiper arm connector which is easy to manufacture.

It is still another object of the present invention to provide a wiper arm connector which is low in cost.

It is a further object of the present invention to provide a wiper arm connector which is practical in use.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
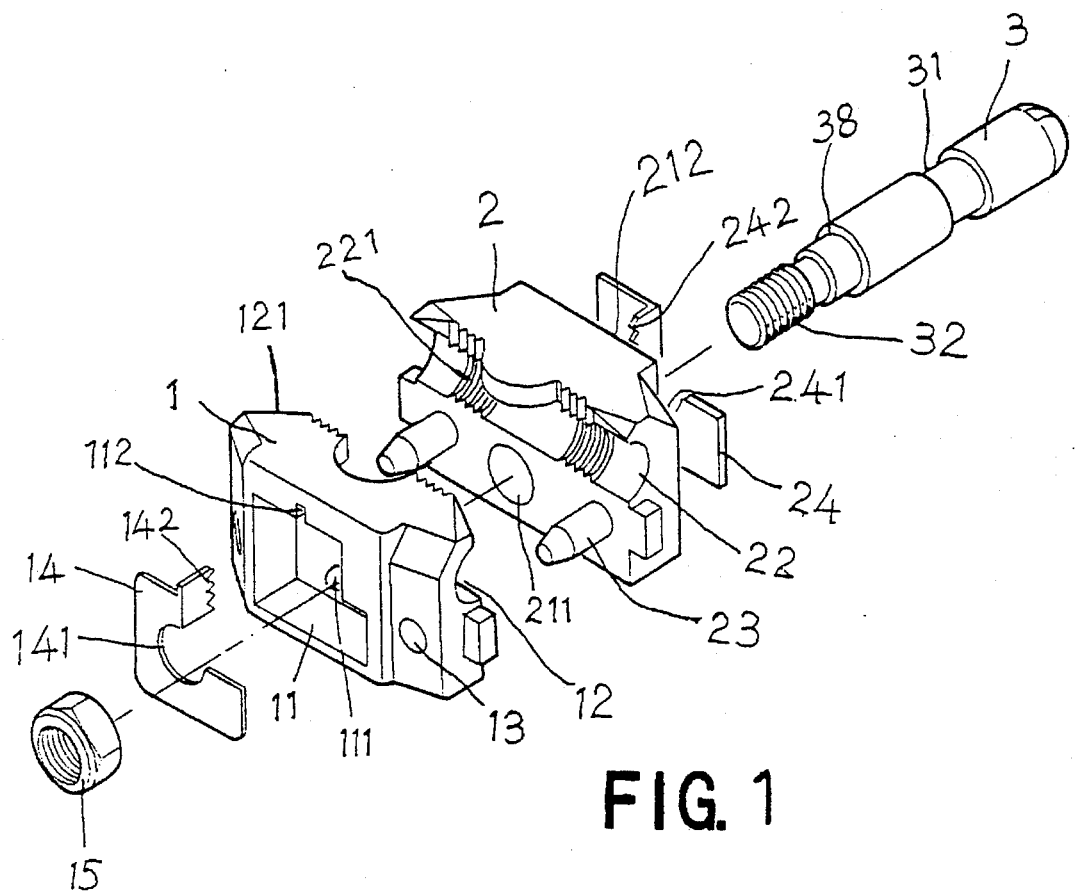
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
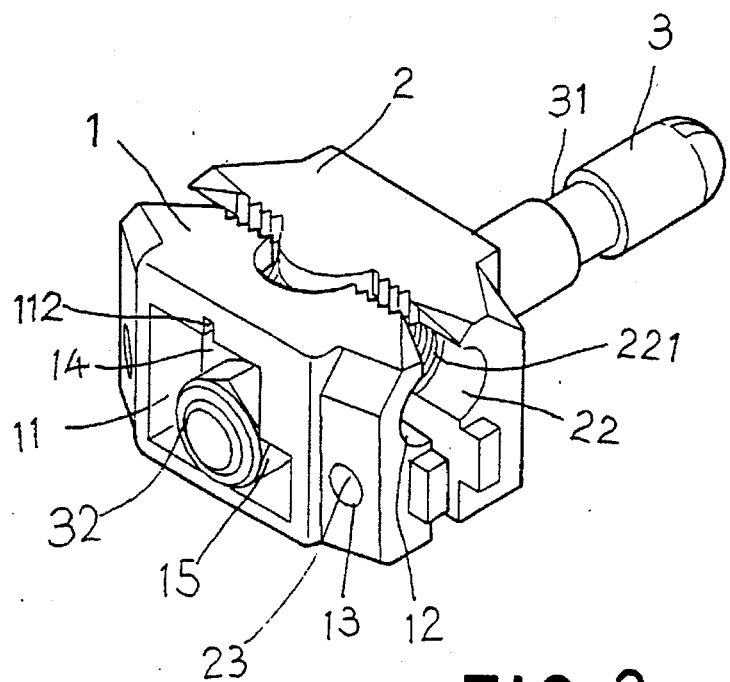
FIG. 2 is a perspective view of the present invention.

With reference to the drawings and in particular to FIGS. 1 and 2 thereof, the wiper arm connector according to the present invention mainly comprises a left jaw 1, a right jaw 2, a locking pin 3, a nut 15, and two packings 14 and 24.

Figure 3:
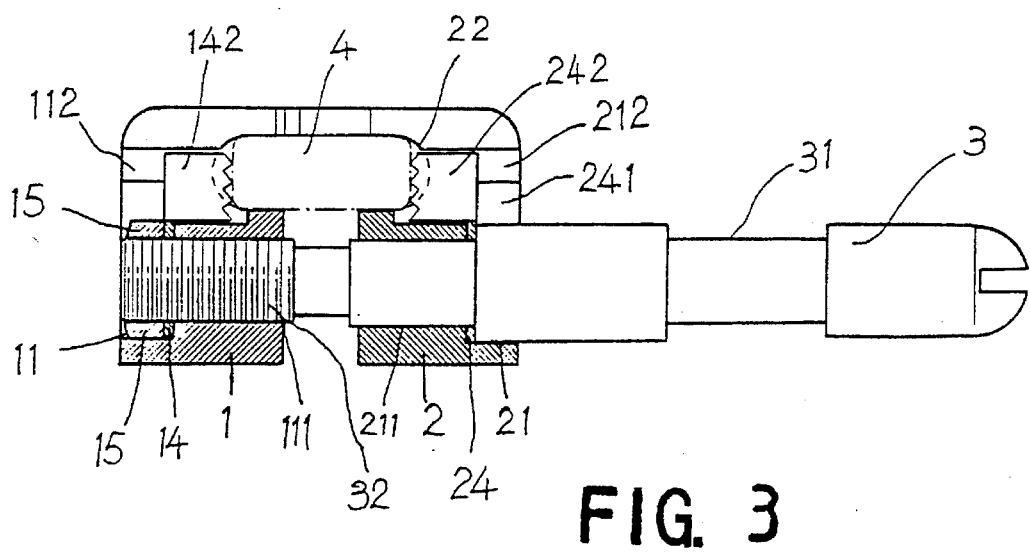
FIG. 3 is a sectional view of the present invention.

The left and right jaws 1 and 2 have cavities 12 and 22 at the inner sides which are provided with a plurality of teeth 121 and 221, respectively. The outer sides of the left and right jaws 1 and 2 are formed with recesses 11 and 21 respectively (see FIGS. 1, 2 and 3). The recesses 11 and 21 are formed with slots 112 and 212 at the upper sides and holes 111 and 211 at the central portions, respectively. The left jaw 1 is formed with two holes 13 adapted to receive two studs 23 of the right jaw 2.

The packings 14 and 24 are symmetric in structure and have openings 141 and 241 at the central portion and toothed portions 142 and 242 extending toward the recesses 11 and 21. The toothed portions 142 and 242 are fitted in the slots 112 and 212, respectively.

The locking pin 3 is formed with threads 32 at an end, a shoulder 38 having a diameter larger than the openings 141 and 241 of the packings 14 and 24, and a groove 31 close to the other end. The locking pin 3 is inserted through right and left jaws 1 and 2 to engage with a nut 15.

Figure 5:
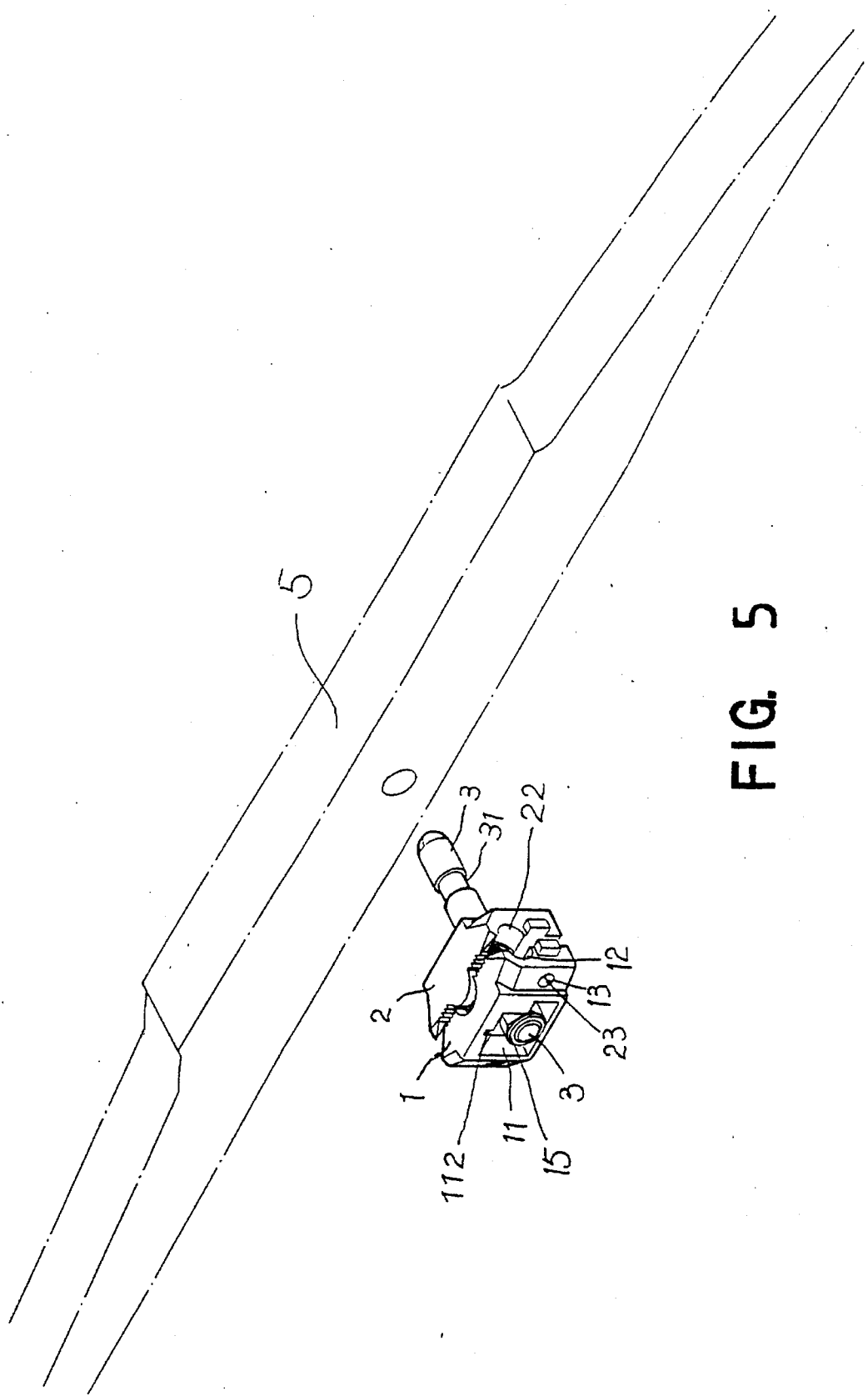
FIG. 5 illustrates how to engage the present invention with a wiper arm.
Figure 6:
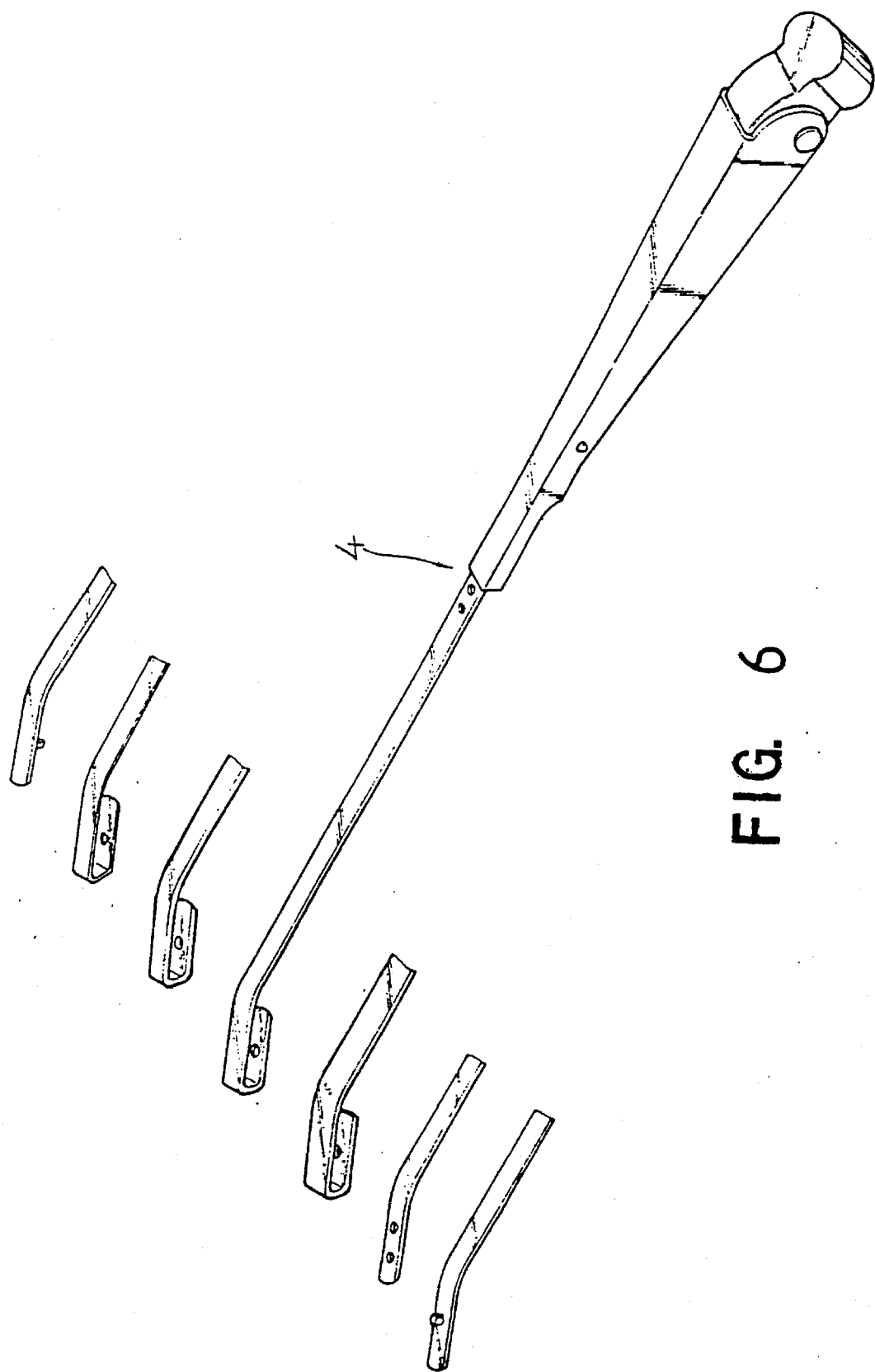
FIG. 6 illustrates wiper arms of different sizes and shapes.

FIG. 5 illustrates how the wiper arm 4 is firmly kept between the jaws 1 and 2 of the connector according to the present invention. As shown, the jaws 1 and 2 may be forced to go inwardly or outwardly by turning the locking pin 3 thereby securely clamping the wiper arm 4 or releasing the wiper arm 4.

Figure 4A:
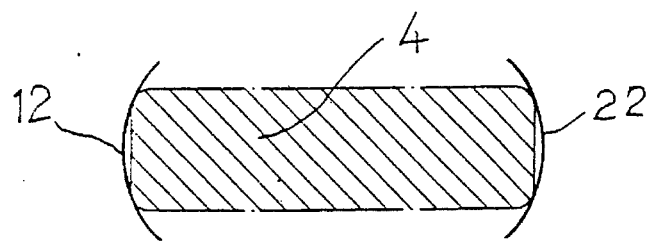
FIG. 4A illustrates the shape of the engaging portion.
Figure 4B:
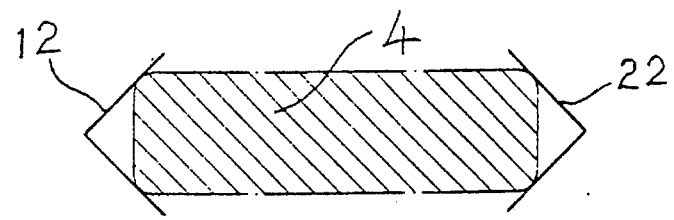
FIG. 4B illustrates a second preferred shape of the engaging portion.
Figure 4C:
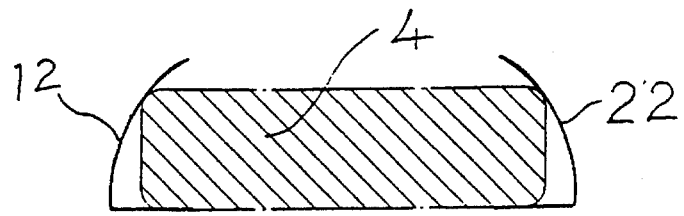
FIG. 4C illustrates a third preferred shape of the engaging portion.

It should be noted, however, that the cavities 12 and 22 of the jaws 1 and 2 may be in shape of a portion of a circle as shown in FIG. 4A, in shape of an angle as shown in FIG. 4B, or in shape of a sector as shown in FIG. 4C.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A wiper arm connector comprising:

a first jaw having a cavity at a first side formed with a plurality of teeth, a recess at a second side having a hole at a central portion thereof and a slot at an upper side thereof, two holes one at a side of said recess;

a second jaw having a cavity at a first side formed with a plurality of teeth, a recess at a second side having a hole at a central portion thereof and a slot at an upper side thereof, two studs at the first side of said second jaw adapted to engage with the two holes of said first jaw;

a first packing having an opening at a central portion thereof and a toothed portion at an upper portion thereof, said first packing being fitted in the recess of said first jaw with said toothed portion fitted in said slot of said first jaw;

a second packing having an opening at a central portion thereof and a toothed portion at an upper portion thereof, said second packing being fitted in the recess of said second jaw with said toothed portion of said second packing fitted in said slot of said second jaw;

a locking pin having a threaded end and a shoulder at an intermediate portion thereof, said shoulder being larger than the opening of said first and second packings, said locking pin being inserted through said jaws to engage with a nut with said shoulder bearing against a respective packing.

\* \* \* \* \*